Patented Mar. 5, 1929.

1,704,629

UNITED STATES PATENT OFFICE.

ANDRÉ ALBERT SAMUEL, OF PARIS, FRANCE.

ELECTRIC AND THERMAL INSULATOR AND PROCESS FOR MANUFACTURING SAME.

No Drawing. Application filed July 11, 1922, Serial No. 574,270, and in France August 1, 1921.

This invention has for its object a new product constituted by a definite chemical compound possessing a great electric and thermal insulating power.

This compound is obtained by the action of sulphur chloride, particularly sulphur mono-chloride, on the condensation product of phenol or its homologues with aldehydes of the aliphatic series, or generally, on the compounds having a high molecular weight or polymerized. The formula of the chemical compound obtained is

The condensation product phenol-formaldehyde, particularly, possesses a molecule whose constitution is not well known of a high molecular weight and polymerized. This molecule, owing to the action of sulphur chloride, gives thio compounds which may be solidified by heat, hydrochloric acid and water.

The process of manufacture of this insulating compound is as follows:—

The two constituents of the reaction, namely, the sulphur mono-chloride and the phenolic condensation product selected, for instance, condensed phenol-formaldehyde, are mixed together. The reaction is very active and very exothermic and the temperature of the mass rises to such an extent that the latter tends to solidify rapidly before the end of the evolution of gas, which would result in a spongy material. To slow down and regulate the reaction the latter is effected in the midst of an inert medium with energetic cooling and the sulphur chloride is introduced drop by drop. The inert medium used must preferably have a high boiling point: one can use, for instance, petroleum jelly. In this manner one obtains a homogeneous material of the consistency of putty, which hardens after a few hours of heating in the steam oven. Before this heating in the steam oven, one can advantageously submit the material to pressure so as to increase its homogeneity in eliminating all traces of internal gas.

The final product obtained presents an appearance similar to that of wood and is worked like the latter; it chars like all organic matters but does not burn; it has a density approaching 1, is not brittle, has a very high resistivity, a thermal conductivity which is extremely small and a very small co-efficient of thermal dilatation, which renders it breakable with difficulty under the action of sudden temperature variations. This material does not melt and does not soften with heat; it is not hygrometric and is only with difficulty attacked by various chemical reagents. Its insulating and mechanical properties are not altered by successive heatings and coolings. Finally this matter when in the pasty condition, can be used as a cement to solder completed parts of this same material, in a manner absolutely homogeneous.

The inert medium may in some cases and according to the industrial purpose sought, be left partially in the mass and mechanically retained when the latter solidifies.

Instead of sulphur mono-chloride as indicated in the above example, one can use either sulphur dichloride or even flower of sulphur or sulphur in solution, under pressure and at a relatively high temperature; the result obtained would be approximately the same. In the reaction, sulphur, sulphur dichloride, and sulphur monochloride are considered equivalents, since the resulting product has approximately the same characteristics.

The products aimed at by this invention can be generalized by extending them to those which are obtained by introduction of sulphur atoms in the molecule of compounds having a high molecular weight or polymerized.

The sulphur can be introduced as in the former case, for instance by the action of the sulphur chlorides or by that of sulphur in the form of flower of sulphur or of a sulphur solution.

The various products obtained according to the present invention are capable of being used as a plastic material.

Having now particularly described and ascertained the nature of my said invention and in what manner the same is to be performed, I declare that what I claim is:—

1. An electric and thermal insulator, comprising the reaction product of sulphur chloride and a condensation product of a phenol and a reactive methylene compound.

2. An electric and thermal insulator, comprising the reaction product of sulphur and the condensation product of a phenol and a reactive methylene compound.

3. An electric and thermal insulator, comprising the product of reaction of chloride of sulphur on a condensation product of a phenol and formaldehyde.

4. The art of making an electric and thermal insulator, which comprises causing reaction of sulphur chloride upon a condensation product of a phenol and a reactive methylene compound, and hardening the product.

5. The art of making an electric and thermal insulator, which comprises reacting with chloride of sulphur on a product of condensation of a phenol, and hardening the product.

6. The art of making an electric and thermal insulator, which comprises slowly introducing in small quantities chloride of sulphur to a condensation product of a phenol and formaldehyde and heating the mass to harden it.

7. The art of making an electric and thermal insulator, which comprises mixing an inert body with a condensation product of a phenol and formaldehyde, and slowly introducing small quantities of chloride of sulphur, and heating the product to harden it.

8. The art of making an electric and thermal insulator, which comprises mixing an inert body with a condensation product of a phenol and formaldehyde, reacting thereon with small quantities of sulphur chloride slowly introduced, and compressing and heating the product.

9. The art of making an electric and thermal insulator, which comprises mixing with a condensation product of a phenol and formaldehyde an inert product capable of retarding exothermic reaction, and reacting on the mixture with a chloride of sulphur slowly added in small quantities to produce a moldable mass, and compressing and heating the mass in its final form.

In testimony that I claim the foregoing as my invention I have signed my name.

ANDRÉ ALBERT SAMUEL.